United States Patent
Ando et al.

(10) Patent No.: US 9,126,596 B2
(45) Date of Patent: Sep. 8, 2015

(54) CONTROL SYSTEM FOR VEHICLE AND CONTROL METHOD THEREFOR

(71) Applicants: Yasushi Ando, Toyota (JP); Norikazu Okita, Okazaki (JP); Hiroki Naganuma, Nishio (JP)

(72) Inventors: Yasushi Ando, Toyota (JP); Norikazu Okita, Okazaki (JP); Hiroki Naganuma, Nishio (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/222,052

(22) Filed: Mar. 21, 2014

(65) Prior Publication Data

US 2014/0288798 A1    Sep. 25, 2014

(30) Foreign Application Priority Data

Mar. 25, 2013 (JP) ................................. 2013-061781

(51) Int. Cl.
*B60W 30/14* (2006.01)
*F02N 11/08* (2006.01)

(52) U.S. Cl.
CPC ........... *B60W 30/14* (2013.01); *F02N 11/0818* (2013.01); *F02N 2200/101* (2013.01); *F02N 2200/102* (2013.01); *F02N 2200/125* (2013.01)

(58) Field of Classification Search
USPC ............. 701/1, 36, 45, 49, 58, 70, 93, 96, 97, 701/99, 101, 112, 113, 123; 340/438, 439, 340/441; 180/170, 178, 179, 271, 272, 282, 180/65.21, 65.245, 65.25, 65.265, 65.275, 180/65.28, 65.285
See application file for complete search history.

(56) References Cited

U.S. PATENT DOCUMENTS

| | | | |
|---|---|---|---|
| 6,330,508 B1 | 12/2001 | Akabori et al. | |
| 6,424,053 B1* | 7/2002 | Wakashiro et al. | 290/40 C |
| 7,337,056 B2* | 2/2008 | Arai | 701/96 |
| 8,078,382 B2* | 12/2011 | Sugano et al. | 701/96 |
| 8,239,121 B2* | 8/2012 | Hattori et al. | 701/105 |
| 8,615,352 B2* | 12/2013 | Maruyama | 701/96 |

FOREIGN PATENT DOCUMENTS

| | | |
|---|---|---|
| JP | 2001-010371 A | 1/2001 |
| JP | 2003-226154 A | 8/2003 |
| JP | 3451931 B | 9/2003 |
| JP | 2006-170295 A | 6/2006 |
| JP | 2012-011969 A | 1/2012 |
| JP | 2012206593 A | 10/2012 |

* cited by examiner

*Primary Examiner* — Thomas Tarcza
*Assistant Examiner* — Edward Pipala
(74) *Attorney, Agent, or Firm* — Gifford, Krass, Sprinkle, Anderson & Citkowski, P.C.

(57) ABSTRACT

A control system for a vehicle including a brake pedal operable by a driver and an engine includes an electronic control unit. The electronic control unit is configured to: (a) execute cruise control, the cruise control selectively executed and stopped through an operation of the driver, (b) stop the engine upon depression of the brake pedal, when the cruise control is stopped, (c) stop the engine while the vehicle is being decelerated or stopped, even when the brake pedal is not depressed, when the cruise control is executed, and (d) keep the engine stopped even when the operation to stop the cruise control is performed, after the engine is stopped and the cruise control is executed.

8 Claims, 7 Drawing Sheets

CONTROL SYSTEM FOR VEHICLE AND CONTROL METHOD THEREFOR

INCORPORATION BY REFERENCE

The disclosure of Japanese Patent Application No. 2013-061781 filed on Mar. 25, 2013 including the specification, drawings and abstract is incorporated herein by reference in its entirety.

BACKGROUND OF THE INVENTION

1. Field of the Invention

The invention relates to a control system for a vehicle, and in particular to a control system that performs control of an engine when automatic cruise control is stopped while the vehicle is stopped. The invention relates to a control method for the vehicle.

2. Description of Related Art

A vehicle having an idling stop function is known in which an engine is automatically stopped while the vehicle is stopped, for example, so as to reduce the amount of consumption of fuel. As one example, the engine is automatically stopped upon depression of a brake pedal. In the meantime, when cruise control for automatically following a vehicle ahead is executed, the engine can be automatically stopped even when the brake pedal is not depressed while the vehicle is decelerated or stopped.

SUMMARY OF THE INVENTION

However, in the case where the engine is stopped during automatic cruise control, if the cruise control is stopped, the engine may be started since the brake pedal is not depressed. Since the engine is started even when the driver does not positively perform an operation to start the engine, the driver may feel uneasy.

The invention provides a control system and a control method for a vehicle, which is able to alleviate the uneasiness of the driver.

A control system according to a first aspect of the invention includes an electronic control unit. The electronic control unit (a) executes cruise control so as to automatically follow a vehicle ahead, the cruise control being selectively executed and stopped through an operation of a driver, (b) stops the engine upon depression of the brake pedal, when the cruise control is stopped, (c) stops the engine while the vehicle is being decelerated or stopped, even when the brake pedal is not depressed, when the cruise control is executed, and (d) keeps the engine stopped even when the operation to stop the cruise control is performed by the driver, after the engine is stopped and the cruise control is executed.

The engine is not started even when the operation to stop the cruise control is performed, after the engine is stopped and the cruise control is executed; thus, the engine is not started even when the brake pedal is not depressed by the driver. Accordingly, the engine can be prevented from being started when the driver does not positively perform an operation to start the engine. Thus, uneasiness of the driver can be alleviated.

In the control system as described above, the electronic control unit may keep the engine stopped, even when the operation to stop the cruise control is performed while the vehicle is being decelerated under the cruise control, after the engine is stopped and the cruise control is executed.

Since the engine is not started during deceleration, the amount of fuel wastefully consumed can be reduced.

Further, in the control system as described above, the electronic control unit may keep the engine stopped, even when the operation to stop the cruise control is performed while the vehicle ahead is being decelerated or stopped, after the engine is stopped and the cruise control is executed.

Since the engine is not started when the vehicle ahead is decelerated or stopped, a sufficiently large distance between the own vehicle and the vehicle ahead can be maintained.

Further, in the control system as described above, the electronic control unit may keep the engine stopped, and maintain at least a part of braking force provided through the cruise control, even when the operation to stop the cruise control is performed, after the engine is stopped and the cruise control is executed.

Since the braking force is maintained, the vehicle is prevented from moving backward even when the engine is not started.

Further, in the control system as described above, the electronic control unit may start the engine, when the accelerator pedal is depressed while the engine is kept stopped.

Since the driver can start the engine by operating the accelerator pedal, the driver can cause the vehicle to run according to his/her request.

Further in the control system as described above, the electronic control unit may keep the cruise control executed, even when the operation to stop the cruise control is performed, after the engine is stopped and where the cruise control is executed.

Since the cruise control is not stopped; malfunction due to an erroneous operation by the driver can be prevented.

Further, in the control system as described above, the electronic control unit may stop the cruise control, when the brake pedal is depressed while the cruise control is kept executed.

Since the cruise control is stopped, the vehicle can be prevented from being started against the intension of the driver to stop the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
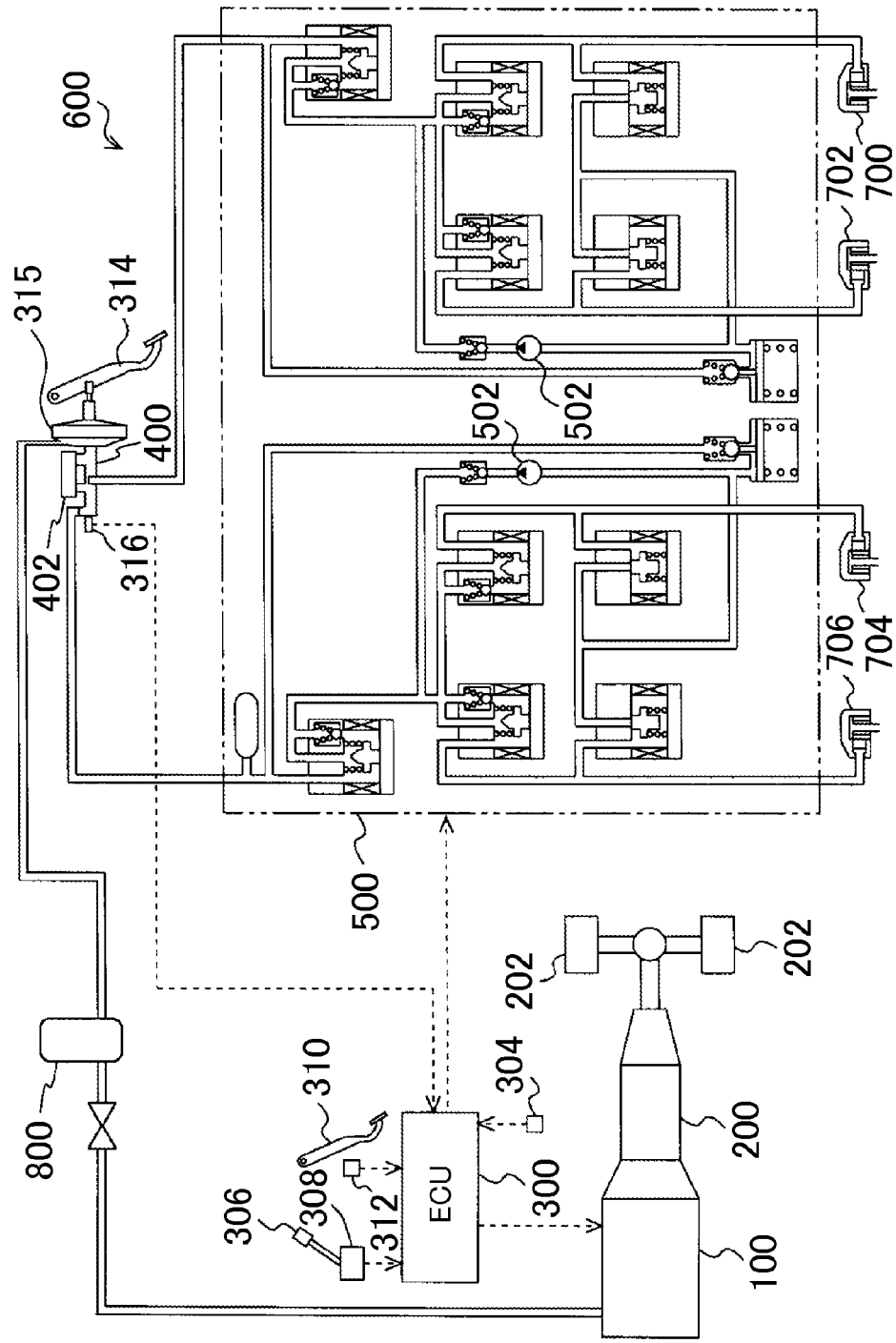
FIG. 1 is a schematic view of the configuration of a vehicle.

One embodiment of the invention will be described with reference to the drawings. In the following description, the same reference numerals are assigned to the same components. These components have the same names and the same functions. Accordingly, detailed description of these components will not be repeated.

Referring to FIG. 1, the vehicle includes an engine 100 and a transmission 200. Torque generated in the engine 100 is transmitted to drive wheels 202 via the transmission 200.

The engine 100 is controlled by an ECU (Electronic Control Unit) 300. Signals indicative of detection results are transmitted from a vehicle speed sensor 304, a position switch 308 that detects the position of a shift lever 306, an accelerator pedal position sensor 312 that detects the amount of operation (or acceleration stroke) of an accelerator pedal 310, and a hydraulic sensor 316 that detects a hydraulic pressure supplied from a master cylinder 400, to the ECU 300. In this embodiment, it is determined by means of the hydraulic sensor 316 whether the brake pedal 314 is depressed or returned to the original position. In other words, the hydraulic pressure supplied from the master cylinder 400 is detected as the amount of operation of the brake pedal 314. A stroke sensor that directly detects the amount of operation of the brake pedal 314, or a pedal force sensor that detects pedal force applied to the brake pedal 314, may be used in place of the hydraulic sensor 316.

The brake pedal 314 is coupled to the master cylinder 400 via a brake booster 315. A hydraulic circuit 600 that consists of the master cylinder 400 and a brake actuator 500 connected to the master cylinder 400 is filled with a brake fluid (brake oil). The brake fluid (brake oil) is stored in a reservoir tank 402.

The hydraulic pressure generated by the master cylinder 400 is led to brake calipers 700-706 provided on respective wheels, via the brake actuator 500. The brake calipers 700-706 produce braking force when hydraulic pressures are applied thereto.

The brake actuator 500 leads hydraulic pressures generated by pumps 502 to the respective brake calipers 700-706 by controlling opening/closing of solenoid valves, so as to control brake hydraulic pressures. The brake actuator 500 is controlled by the ECU 300.

A negative-pressure tank 800 is connected to the brake booster 315. A negative pressure developed in the engine 100 is stored in the negative-pressure tank 800. The brake booster 315 increases the pedal force applied to the brake pedal 314, and transmits the resulting force to the master cylinder 400.

Figure 2:
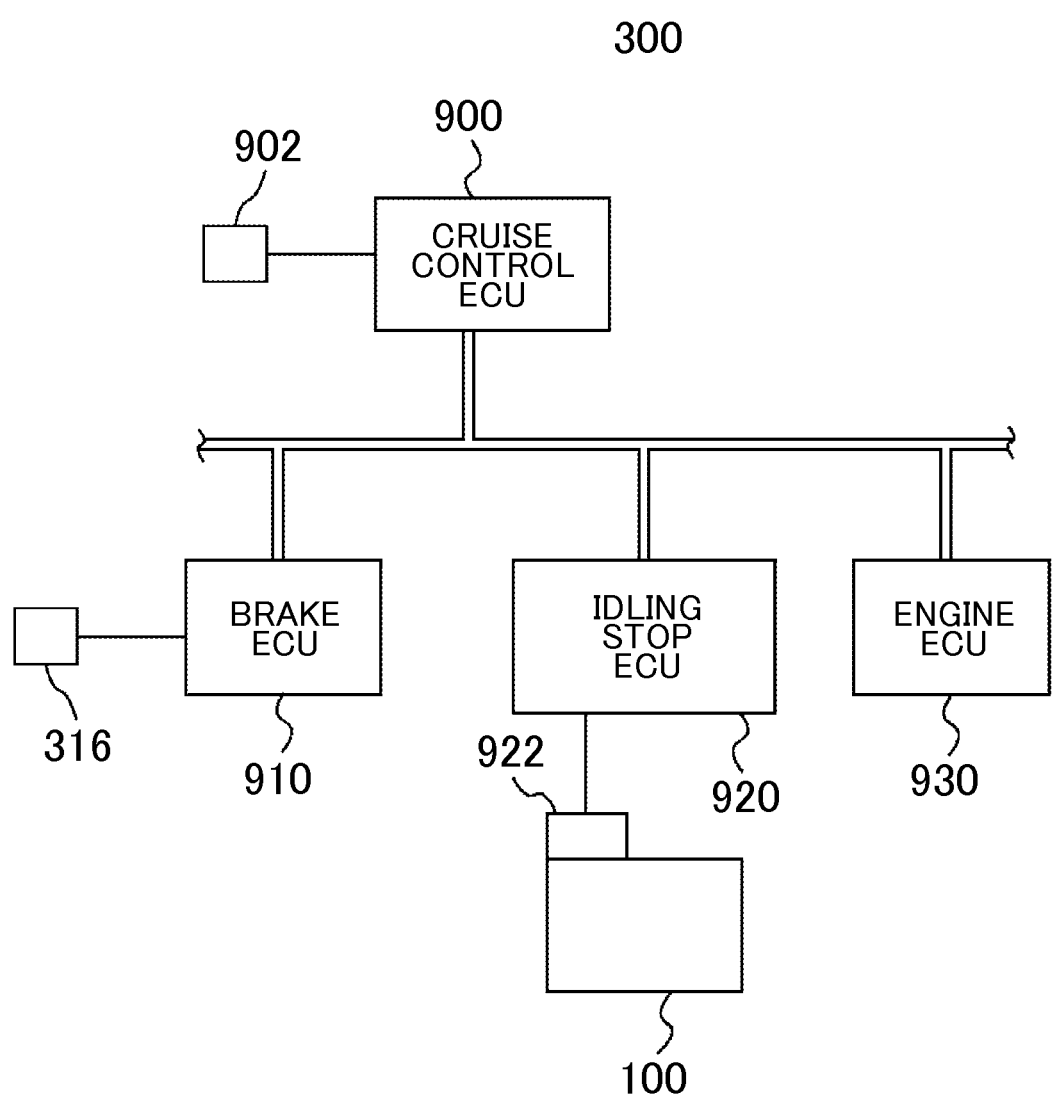
FIG. 2 is a view showing ECU.

Referring to FIG. 2, the ECU 300 will be further described. The ECU 300 includes a cruise control ECU 900, a brake ECU 910, an idling stop ECU 920, and an engine ECU 930. The cruise control ECU 900, brake ECU 910, idling stop ECU 920, and the engine ECU 930 are connected such that they can communicate with each other via CAN (Controller Area Network) communication lines.

The cruise control ECU 900 executes cruise control for automatically following a vehicle ahead. As one example, the cruise control ECU 900 measures a following distance as measured from the vehicle ahead, using a millimeter-wave radar, or the like, and controls the vehicle so that the following distance becomes equal to a given value. Namely, the cruise control ECU 900 accelerates the vehicle if the following distance becomes longer than the given value, and decelerates or stops the vehicle if the following distance becomes shorter than the given value. The cruise control ECU 900 determines a target deceleration to be achieved, from the following distance and the current vehicle speed, referring to a map, or the like, and transmits the this determined target deceleration to the brake ECU 910. Since well-known general technologies may be utilized for the cruise control, detailed description thereof will not be repeated herein.

In this embodiment, the driver operates a switch 902 so as to cause the cruise control ECU 900 to execute the cruise control or not to execute the cruise control. The cruise control may be executed or stopped by using a touch panel, voice, or any other operating method, in place of the switch 902.

The brake ECU 910 receives a detection signal indicative of the hydraulic pressure, directly from the hydraulic sensor 316. The brake ECU 910 controls the brake actuator 500, according to the signal transmitted from the hydraulic sensor 316, etc.

Also, the brake ECU 910 controls the brake actuator 500 so as to achieve the target deceleration received from the cruise control ECU 900. Since well-known general technologies may be utilized for brake control during the cruise control, detailed description of the brake control will not be repeated herein.

In the case where the cruise control is not executed, the idling stop ECU 920 outputs a request for automatically stopping the engine 100, to the engine ECU 930, when certain idle-stop conditions including at least a condition that the brake pedal 314 is being depressed are satisfied. As one example, it is determined that the idle-stop conditions are satisfied, when all of the following conditions that the brake pedal 314 is depressed, the vehicle speed is equal to zero, and the steering angle of the steering wheel is equal to zero, are satisfied.

In the case where the cruise control is executed, on the other hand, a request for automatically stopping the engine 100 is generated to the engine ECU 930, while the vehicle is being decelerated or stopped, even when the brake pedal 314 is not being depressed. As one example, if the vehicle ahead is decelerated or stopped, and the following distance as measured from the vehicle ahead becomes smaller than a given value, the request for stopping the engine 100 is generated. It is, however, to be understood that the condition under which the request for stopping the engine 100 is generated is not limited to this condition.

When a certain re-start condition(s) is/are satisfied, the idling stop ECU 920 outputs a request for re-starting the engine 100, to the engine ECU 930, and drives a starter 922 so as to crank the engine 100.

As one example, in the case where the cruise control is not executed, if the above-described idle-stop conditions cease to be satisfied, the request for re-starting the engine 100 is generated, and the starter 922 is driven. In the case where the cruise control is executed, on the other hand, if the following distance as measured from the vehicle ahead exceeds a given value, due to acceleration of the vehicle ahead, for example, the request for re-starting the engine 100 is generated, and the starter 922 is driven.

The engine ECU 930 controls the fuel injection amount, throttle opening, ignition timing, and so forth, during operation of the engine 100, so as to operate the engine 100 in desired conditions. If the engine ECU 930 receives a request for stopping the engine 100 from the idling stop ECU 920, it stops fuel injection and ignition, for example, so as to stop the engine 100.

Also, if the engine ECU 930 receives a request for re-starting the engine 100 from the idling stop ECU 920, it resumes fuel injection and ignition, for example, so as to start the engine 100.

As described above, the driver is able to cause the cruise control ECU 900 to execute or stop cruise control, by operating the switch 902. Accordingly, after the engine 100 is automatically stopped in a condition where the cruise control is executed, an operation to stop the cruise control may be erroneously performed.

Figure 3:
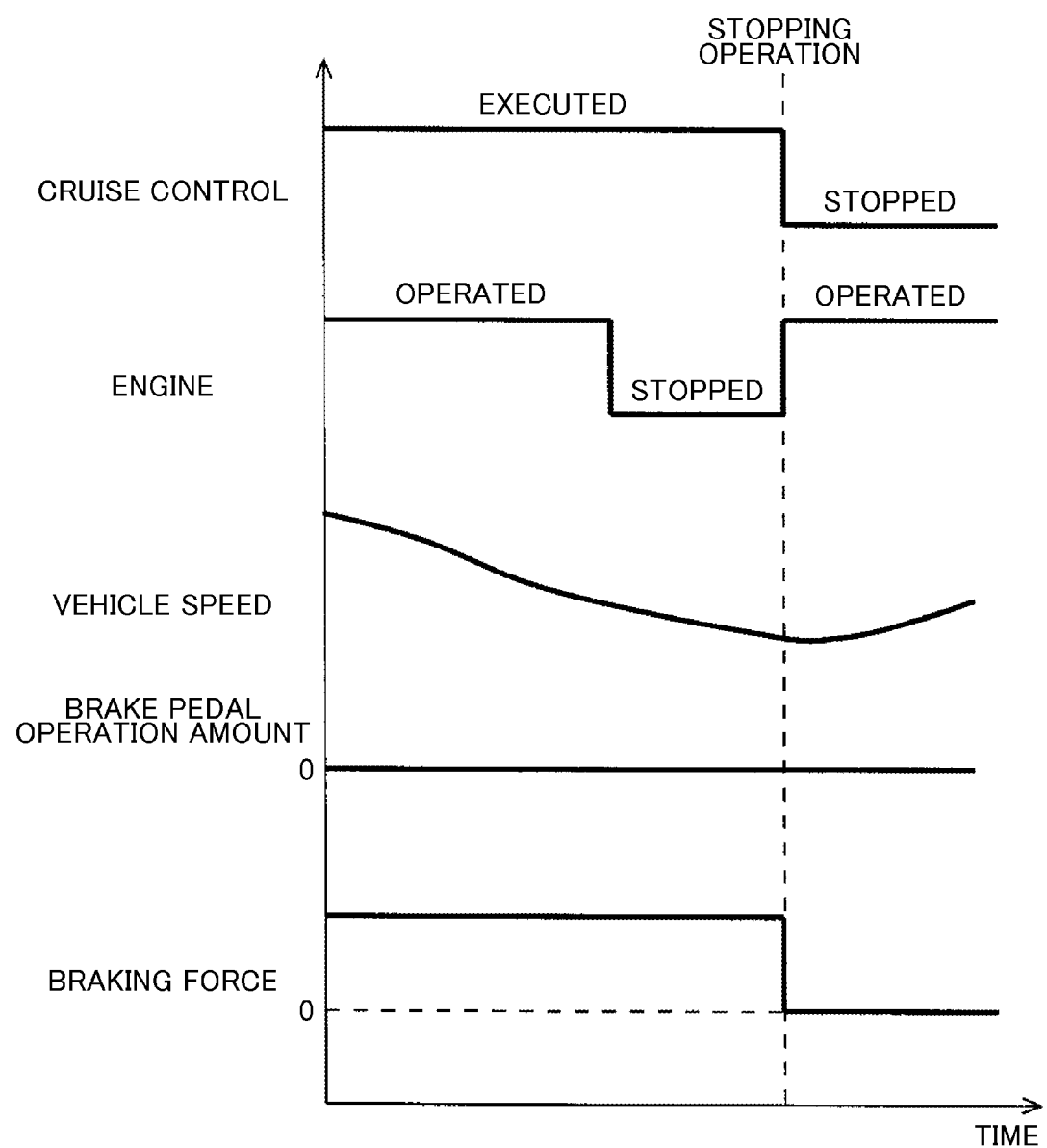
FIG. 3 is a view showing operating conditions of an engine, etc. according to the related art.

As shown in FIG. 3, when the cruise control is stopped after the engine 100 is automatically stopped in a condition where the cruise control is being executed, the engine 100 may be re-started since the brake pedal 314 is not depressed. However, since the driver does not positively perform an operation to start the engine 100, he/she may feel uneasy about starting of the engine 100.

Figure 4:
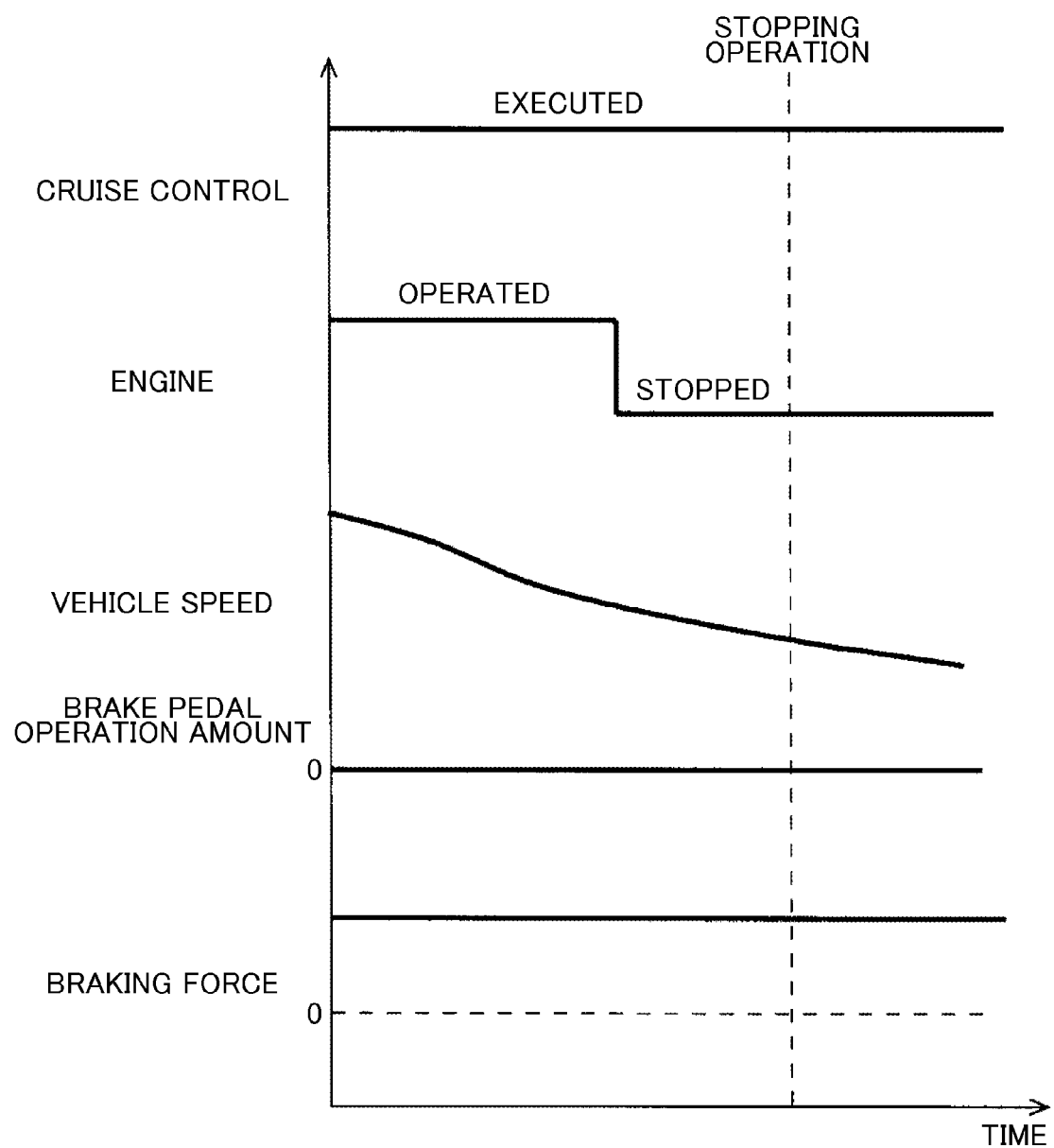
FIG. 4 is a view showing operating conditions of an engine, etc. according to one embodiment of the invention.

In this embodiment, in order to alleviate the uneasiness of the driver, the cruise control is kept executed even when an operation to stop the cruise control is performed by the driver, after the engine 100 is automatically stopped and the cruise control is executed, as shown in FIG. 4. Accordingly, even when an operation to stop the cruise control is performed, after the engine 100 is automatically stopped in a condition where the cruise control is executed, the engine 100 is kept stopped or at rest.

More specifically, even when an operation to stop the cruise control is performed while the vehicle is decelerated under cruise control due to deceleration or stop of the vehicle ahead, after the engine 100 is automatically stopped and the cruise control is executed, the cruise control is kept executed, and the engine is kept stopped or at rest.

If the cruise control is kept executed, the braking force provided through the cruise control is maintained. Accordingly, even when an operation to stop the cruise control is performed after the engine 100 is automatically stopped and the cruise control is executed, the engine 100 is kept stopped, and the braking force provided through the cruise control is maintained. At least a part of the braking force may be retained. Namely, the braking force may be reduced provided that the braking force does not become equal to zero.

Figure 5:
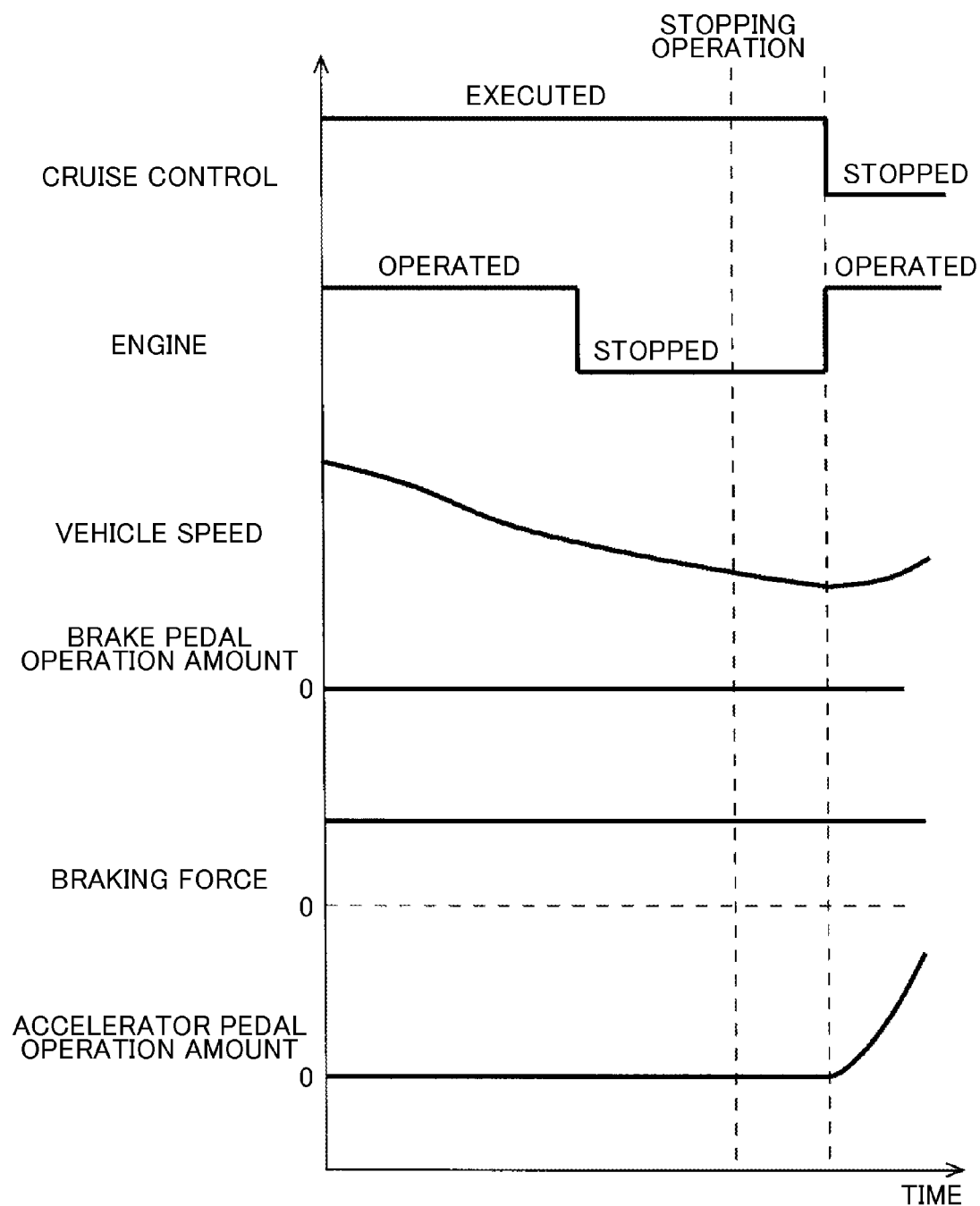
FIG. 5 is a view showing operating conditions of an engine, etc. according to the embodiment of the invention.
Figure 6:
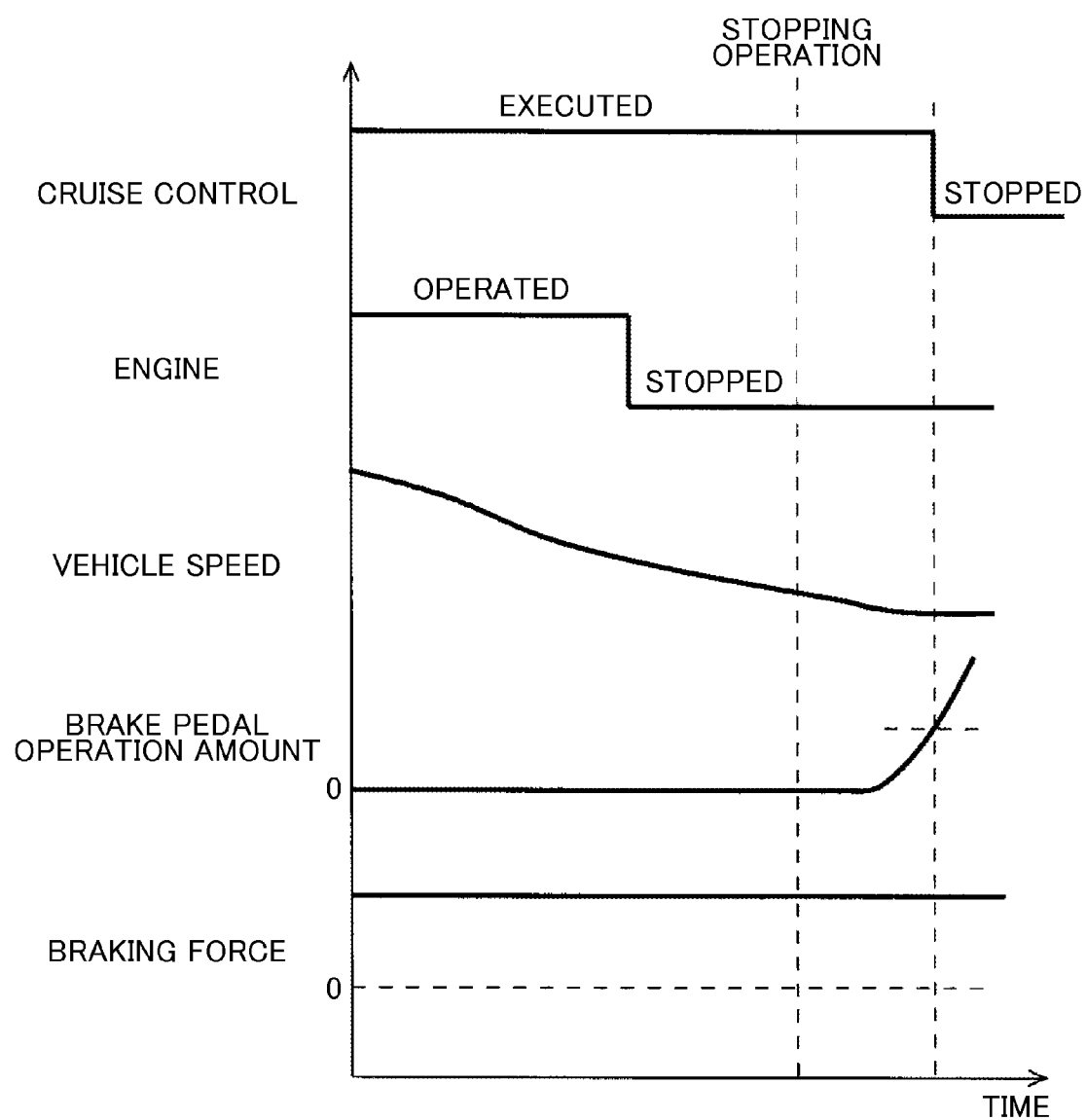
FIG. 6 is a view showing operating conditions of an engine, etc. according to the embodiment of the invention.

As shown in FIG. 5, when the accelerator pedal 310 is depressed while the engine 100 is kept stopped, namely, while the cruise control is kept executed, the engine 100 may be started. As shown in FIG. 6, when the brake pedal 314 is depressed while the cruise control is kept executed, the cruise control may be stopped. As one example, when the hydraulic pressure supplied from the master cylinder 400 (the amount of operation of the brake pedal 314) exceeds a given threshold value, the cruise control is stopped. More specifically, when the hydraulic pressure (operation amount) increases to a hydraulic pressure (operation amount) with which the vehicle can be kept in a stopped state, the cruise control is stopped. The threshold value used for determining whether the cruise control is stopped is determined in advance by a developer from the result of experiment, or the like.

Figure 7:
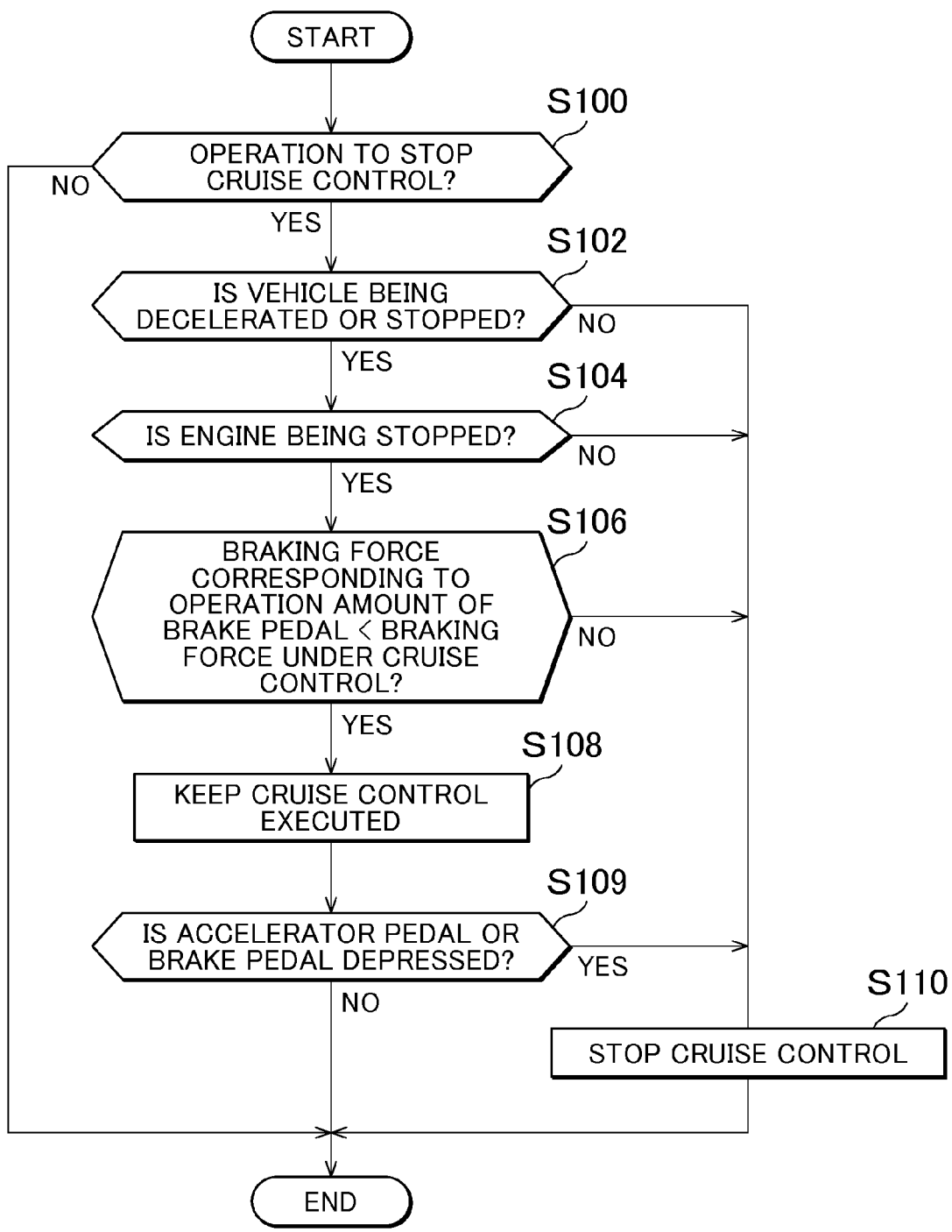
FIG. 7 is a flowchart illustrating a control process executed by the ECU.

Referring to FIG. 7, a control process executed by the ECU 300 will be described. The control process as described below is repeatedly executed at given intervals.

In step S100, it is determined whether an operation to stop cruise control is performed by the driver. If the operation to stop the cruise control is performed (YES in step S100), it is determined in step S102 whether the vehicle is being decelerated or stopped under the cruise control.

If the vehicle is being decelerated or stopped under the cruise control (YES in step S102), it is determined in step S104 whether the engine 100 is being stopped or at rest. Namely, it is determined whether the engine 100 has been stopped, because the following distance as measured from the vehicle ahead is smaller than a given value.

If the engine 100 is stopped (YES in step S104), it is determined in step S106 whether the braking force corresponding to the amount of operation of the brake pedal 314 is smaller than the braking force provided through the cruise control. The braking force corresponding to the amount of operation of the brake pedal 314 is calculated using a map, or the like. If the braking force corresponding to the amount of operation of the brake pedal 314 is smaller than the braking force provided through the cruise control (YES in step S106), the cruise control is kept executed in step S108. As a result, the engine 100 is kept in a stopped state. Also, the braking force provided through the cruise control is maintained.

If the vehicle is being accelerated under the cruise control (NO in step S102), the cruise control is stopped in step S110. Accordingly, if the engine 100 is stopped, and the brake pedal 314 is not depressed, the engine 100 is re-started.

In other cases, i.e., in the case where the engine 100 is not stopped (NO in step S104), and the case where the braking force corresponding to the amount of operation of the brake pedal 314 is equal to or larger than the braking force provided through the cruise control (NO in step S106), the cruise control is stopped (S110).

If the accelerator pedal 310 or the brake pedal 314 is depressed while the cruise control is kept executed (YES in step S109), the cruise control is stopped (S110). When the accelerator pedal 310 is depressed, the cruise control is stopped, resulting in start of the engine 100.

The embodiment disclosed herein should be considered as being illustrative in all respects and not restrictive. The scope of the invention is not defined by the above description but defined by the appended claims, and is intended to include all changes within the range of the claims and equivalents thereof.

What is claimed is:

1. A control system for a vehicle including a brake pedal operable by a driver and an engine, the control system comprising:
   an electronic control unit configured to:
   (a) execute cruise control so as to automatically follow a vehicle ahead, the cruise control selectively executed and stopped through an operation of the driver;
   (b) stop the engine upon depression of the brake pedal, when the cruise control is stopped;
   (c) stop the engine while the vehicle is being decelerated or stopped, even when the brake pedal is not depressed, when the cruise control is executed; and
   (d) keep the engine stopped even when the operation to stop the cruise control is performed by the driver, after the engine is stopped and the cruise control is executed.

2. The control system according to claim 1, wherein the electronic control unit is configured to keep the engine stopped, even when the operation to stop the cruise control is performed while the vehicle is being decelerated under the cruise control, after the engine is stopped and the cruise control is executed.

3. The control system according to claim 1, wherein the electronic control unit is configured to keep the engine stopped, even when the operation to stop the cruise control is performed while the vehicle ahead is being decelerated or stopped, after the engine is stopped and the cruise control is executed.

4. The control system according to claim 1, wherein the electronic control unit is configured to keep the engine stopped, and maintain at least a part of braking force provided through the cruise control, even when the operation to stop the cruise control is performed, after the engine is stopped and the cruise control is executed.

5. The control system according to claim 1, wherein:
   the vehicle further includes an accelerator pedal; and
   the electronic control unit is configured to start the engine, when the accelerator pedal is depressed while the engine is kept stopped.

6. The control system according to claim 1, wherein the electronic control unit is configured to keep the cruise control executed, even when the operation to stop the cruise control is performed, after the engine is stopped and the cruise control is executed.

7. The control system according to claim 6, wherein
the electronic control unit is configured to stop the cruise control, when the brake pedal is depressed while the cruise control is kept executed.

8. A control method for a vehicle including a brake pedal operable by a driver, an engine and an electronic control unit, the control method comprising:
   (a) executing cruise control, using the electronic control unit, so as to automatically follow a vehicle ahead, the cruise control selectively executed and stopped through an operation of the driver;
   (b) stopping the engine, using the electronic control unit, upon depression of the brake pedal, when the cruise control is stopped;
   (c) stopping the engine, using the electronic control unit, while the vehicle is being decelerated or stopped, even when the brake pedal is not depressed, when the cruise control is executed; and
   (d) keeping the engine stopped, using the electronic control unit, even when the operation to stop the cruise control is performed by the driver, after the engine is stopped and the cruise control is executed.

\* \* \* \* \*